(12) United States Patent
Yang et al.

(10) Patent No.: US 11,449,707 B2
(45) Date of Patent: Sep. 20, 2022

(54) METHOD FOR PROCESSING AUTOMOBILE IMAGE DATA, APPARATUS, AND READABLE STORAGE MEDIUM

(71) Applicant: Baidu Online Network Technology (Beijing) Co., Ltd., Beijing (CN)

(72) Inventors: Shaoxiong Yang, Beijing (CN); Chen Zhao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 453 days.

(21) Appl. No.: 16/505,804

(22) Filed: Jul. 9, 2019

(65) Prior Publication Data

US 2019/0332894 A1    Oct. 31, 2019

(30) Foreign Application Priority Data

Aug. 10, 2018  (CN) .......................... 201810910923.9

(51) Int. Cl.
*G06K 9/62* (2022.01)
(52) U.S. Cl.
CPC ......... *G06K 9/6256* (2013.01); *G06K 9/6262* (2013.01)
(58) Field of Classification Search
None
See application file for complete search history.

(56) References Cited

U.S. PATENT DOCUMENTS

| 2008/0122606 A1 | 5/2008 | Bradley | |
| 2011/0184895 A1* | 7/2011 | Janssen | G06V 20/54 706/12 |

(Continued)

FOREIGN PATENT DOCUMENTS

| CN | 106778583 A | 5/2017 |
| CN | 107016406 A | 8/2017 |

(Continued)

OTHER PUBLICATIONS

Zhou, Yi, and Ling Shao. "Cross-View GAN Based Vehicle Generation for Re-identification." In BMVC, vol. 1, pp. 1-12. 2017. (Year: 2017).*
Yan, X., Yang, J., Sohn, K., & Lee, H. (2016, October). Attribute2image: Conditional image generation from visual attributes. In European conference on computer vision (pp. 776-791). Springer, Cham. (Year: 2016).*

(Continued)

*Primary Examiner* — Samah A Beg
(74) *Attorney, Agent, or Firm* — Harness, Dickey & Pierce, P.L.C.

(57) ABSTRACT

Provided are a method for processing automobile image data, an apparatus, and a readable storage medium. The method includes training a preset adversarial network according to automobile image sample data obtained by collecting and preset random noise information, to obtain a trained adversarial network for generating automobile image data; and inputting the automobile image sample data into the trained adversarial network, and generating the automobile image data including a variety of the random noise information, according to a preset generation target, wherein the automobile image data are configured to train an automobile image recognition neural network to perform automobile image recognition. Therefore, the automobile image data that may be used to train an automobile image recognition neural network are generated by using the adversarial network, which amplifies the amount of data, and reduces the cost of obtaining data.

19 Claims, 3 Drawing Sheets

Training a preset adversarial network according to automobile image sample data obtained by collecting and preset random noise information, to obtain a trained adversarial network for generating automobile image data  ∿ 101

Inputting the automobile image sample data into the trained adversarial network to generate the automobile image data including a variety of random noise information, according to a preset generation target, where the automobile image data is used to train an automobile image recognition neural network for performing automobile image recognition  ∿ 102

(56) References Cited

U.S. PATENT DOCUMENTS

| | | | |
|---|---|---|---|
| 2014/0205178 A1 | 7/2014 | Chang et al. | |
| 2018/0336471 A1* | 11/2018 | Rezagholizadeh | G06N 3/08 |
| 2019/0095730 A1* | 3/2019 | Fu | G06K 9/6271 |
| 2019/0147320 A1* | 5/2019 | Mattyus | G06K 9/627 |
| | | | 382/155 |
| 2019/0155284 A1* | 5/2019 | Zavesky | B60W 30/0953 |
| 2019/0220605 A1* | 7/2019 | Kounavis | G06N 3/0454 |
| 2019/0244060 A1* | 8/2019 | Dundar | G06N 3/08 |
| 2020/0134468 A1* | 4/2020 | Ding | G06N 3/088 |
| 2020/0167609 A1* | 5/2020 | Chen | G06K 9/6256 |
| 2020/0250304 A1* | 8/2020 | Kruus | G06N 3/088 |

FOREIGN PATENT DOCUMENTS

| | | |
|---|---|---|
| CN | 107563274 A | 1/2018 |
| CN | 107563385 A | 1/2018 |

OTHER PUBLICATIONS

Yu, Xiaoni:"Computer-generated image detection algorithm under image noise analysis," Image Processing & Multimedia Tachnology, Feb. 2016, pp. 75-76 (English Abstract).

* cited by examiner

METHOD FOR PROCESSING AUTOMOBILE IMAGE DATA, APPARATUS, AND READABLE STORAGE MEDIUM

CROSS-REFERENCE TO RELATED APPLICATIONS

This application claims priority to Chinese Patent Application No. 201810910923.9, filed on Aug. 10, 2018, entitled "Method for Processing Automobile Image Data, Apparatus, and Readable Storage Medium", which is incorporated herein by reference in its entirety.

FIELD OF THE TECHNOLOGY

The present disclosure relates to a computer technology and, in particular, to a method for processing automobile image data, an apparatus, and a readable storage medium.

BACKGROUND

With the improvement of artificial intelligence technology, machine learning models including neural networks are increasingly being applied to various industries.

In the field of recognizing an automobile image, due to different automobile shapes, automobile colors in the market, as well as different driving environments, in order to accurately recognize the automobile image, a large number of automobile images need to be collected and manually marked in the prior art so as to obtain automobile image data, and use it to train an automobile image recognition model.

However, since collecting and marking automobile images are of relatively high cost, and may be limited to scenes and environments, it is often impossible to obtain the automobile image data that may be used to train the automobile image recognition model in batches, so how to obtain more automobile image data becomes a problem.

SUMMARY

In view of the aforementioned problem that since collecting and marking automobile images are of relatively high cost, and may be limited to scenes and environments, it is often impossible to obtain the automobile image data that may be used to train the automobile image recognition model in batches, the present disclosure provides a method and an apparatus for processing automobile image data, and a readable storage medium.

In one aspect, the present disclosure provides a method for processing automobile image data, including:

training a preset adversarial network according to automobile image sample data obtained by collecting and preset random noise information, to obtain a trained adversarial network for generating automobile image data; and inputting the automobile image sample data into the trained adversarial network according to a preset generation target, to generate automobile image data including a variety of random noise information, where the automobile image data is used to train an automobile image recognition neural network for performing an automobile image recognition.

In an optional embodiment, the training a preset adversarial network according to automobile image sample data obtained by collecting and preset random noise information, to obtain a trained adversarial network for generating automobile image data, includes:

generating, by an adversarial generation sub-network in the adversarial network, a first generation sample, according to the random noise information and the automobile image sample data obtained by collecting;

obtaining, by an adversarial recognition sub-network in the adversarial network, a first judgment result corresponding to the first generation sample; and training the adversarial generation sub-network and the adversarial recognition sub-network according to a preset convergence equation, to obtain a trained adversarial network.

In an optional embodiment, the inputting the automobile image sample data into the trained adversarial network according to a preset generation target, to generate automobile image data including a variety of random noise information, includes:

extracting feature information of the automobile image sample data by using the trained adversarial network; and adding random noise information to the feature information by using the trained adversarial network according to a preset target, to obtain the automobile image data including a variety of random noise information.

In an optional embodiment, the random noise information includes one or more of an automobile color noise, an automobile shape noise, and a background color noise.

In an optional embodiment, when the random noise information includes the automobile color noise, the extracted feature information of the automobile image sample data includes an automobile non-color feature; and the adding random noise information to the feature information by using the trained adversarial network according to the preset target, to obtain the automobile image data including a variety of random noise information, includes:

adding the automobile color noise to the automobile non-color feature by using the trained adversarial network according to a preset target automobile color, to obtain automobile image data including a preset automobile color.

In an optional embodiment, when the random noise information includes the automobile shape noise, the extracted feature information of the automobile image sample data includes an automobile non-shape feature; and the adding random noise information to the feature information by using the trained adversarial network according to the preset target, to obtain the automobile image data including a variety of random noise information, includes:

adding the automobile shape noise to the automobile non-shape feature by using the trained adversarial network according to a preset target shape, to obtain automobile image data including a preset automobile shape.

In an optional embodiment, when the random noise information includes the background color noise, the extracted feature information of the automobile image sample data includes an automobile non-background color feature; and the adding random noise information to the feature information by using the trained adversarial network according to the preset target, to obtain the automobile image data including a variety of random noise information, includes:

adding the background color noise to the automobile non-color feature by using the trained adversarial network, according to a preset target background color, to obtain automobile image data including a preset background color.

In another aspect, the present disclosure provides a method for processing automobile image data, including:

constructing an automobile image recognition neural network to be trained; and training the automobile image recognition neural network to be trained by using the automobile image data obtained by the method according to any one of the above aspects, to obtain a trained automobile image recognition neural network.

In another aspect, the present disclosure provides a method for processing automobile image data, including:

collecting an automobile image to be recognized; and recognizing the automobile image to be recognized by using a trained automobile image recognition neural network, to obtain a recognition result; where the trained automobile image recognition neural network is obtained according to the above method.

In another aspect, an apparatus for processing automobile image data, includes:

a first processing unit configured to train a preset adversarial network according to automobile image sample data obtained by collecting and preset random noise information, to obtain a trained adversarial network for generating automobile image data; and a second processing unit configured to input the automobile image sample data into the trained adversarial network according to a preset generation target, to generate automobile image data including a variety of random noise information, where the automobile image data is used to train an automobile image recognition neural network for performing an automobile image recognition.

In an optional embodiment, the first processing unit is specifically configured to:

generate, by an adversarial generation sub-network in the adversarial network, a first generation sample, according to the random noise information and the automobile image sample data obtained by collecting;

obtain, by an adversarial recognition sub-network in the adversarial network, a first judgment result corresponding to the first generation sample; and train the adversarial generation sub-network and the adversarial recognition sub-network, according to a preset convergence equation, to obtain the trained adversarial network.

In an optional embodiment, the second processing unit is specifically configured to:

extract feature information of the automobile image sample data by using the trained adversarial network; and add random noise information to the feature information by using the trained adversarial network according to the preset target, to obtain the automobile image data including a variety of random noise information.

In an optional embodiment, the random noise information includes one or more of an automobile color noise, an automobile shape noise, and a background color noise.

In an optional embodiment, when the random noise information includes an automobile color noise, the extracted feature information of the automobile image sample data includes an automobile non-color feature; and the second processing unit is specifically configured to add the automobile color noise to the automobile non-color feature by using the trained adversarial network according to the preset target, to obtain automobile image data including a preset automobile color.

In an optional embodiment, when the random noise information includes an automobile shape noise, the extracted feature information of the automobile image sample data includes an automobile non-shape feature; and the second processing unit is specifically configured to add the automobile shape noise to the automobile non-shape feature by using the trained adversarial network according to a preset target shape, to obtain automobile image data including a preset automobile shape.

In an optional embodiment, when the random noise information includes a background color noise, the extracted feature information of the automobile image sample data includes an automobile non-background color feature; and the second processing unit is specifically configured to add the background color noise to the automobile non-background color feature by using the trained adversarial network according to a preset target background color, to obtain automobile image data including a preset background color.

In still another aspect, the present disclosure provides an apparatus for processing automobile image data, including:

a constructing unit configured to construct an automobile image recognition neural network to be trained; and a training unit configured to train the automobile image recognition neural network to be trained by using the automobile image data obtained by the method according to any one of the above aspects, to obtain a trained automobile image recognition neural network.

In still another aspect, the present disclosure provides an apparatus for processing automobile image data, including:

a collecting unit configured to collect an automobile image to be recognized; and a recognizing unit configured to recognize the automobile image to be recognized by using a trained automobile image recognition neural network, to obtain a recognition result; where the trained automobile image recognition neural network is obtained according to the above method.

In yet another aspect, the present disclosure provides an apparatus for processing automobile image data, including a memory, a processor connected to the memory, and a computer program stored on the memory and runnable on the processor, where, the method according to any one of the above aspects is performed when the processor runs the computer program.

In a final aspect, the present disclosure provides a readable storage medium, including a program, when the program runs on a terminal, the terminal performs the method according to any one of the aspects.

The method and the apparatus for processing automobile image data, and the readable storage mediums according to the present disclosure are performed by training a preset adversarial network according to automobile image sample data obtained by collecting and preset random noise information, to obtain a trained adversarial network for generating automobile image data; and inputting the automobile image sample data into the trained adversarial network according to a preset generation target, to generate automobile image data including a variety of random noise information, where the automobile image data is used to train an automobile image recognition neural network for performing an automobile image recognition. Thus, it is possible to use an adversarial network to generate automobile image data that may be used to train an automobile image recognition neural network, thereby amplifying the amount of data and reducing the cost of obtaining the data.

BRIEF DESCRIPTION OF THE DRAWINGS

Embodiments defined by the present disclosure have been shown through the accompanying drawings, which will be described in detail below. The drawings and descriptions are not intended to limit the scope of the present disclosure in any way, but to describe the concept of the present disclosure to those skilled in the art with reference to the specific embodiments.

The drawings herein are incorporated in the description and constitute a part of the description, showing embodiments in conformity with the present disclosure and being intended to illustrate principles of the present disclosure.

DESCRIPTION OF EMBODIMENTS

To make the objectives, technical solutions and advantages of embodiments of the present disclosure clearer, the technical solutions of the embodiments of the present disclosure will be clearly and comprehensively described below with reference to the accompanying drawings of the embodiments of the present disclosure.

With the improvement of artificial intelligence technology, machine learning models including neural networks are increasingly being applied to various industries.

Figure 1:
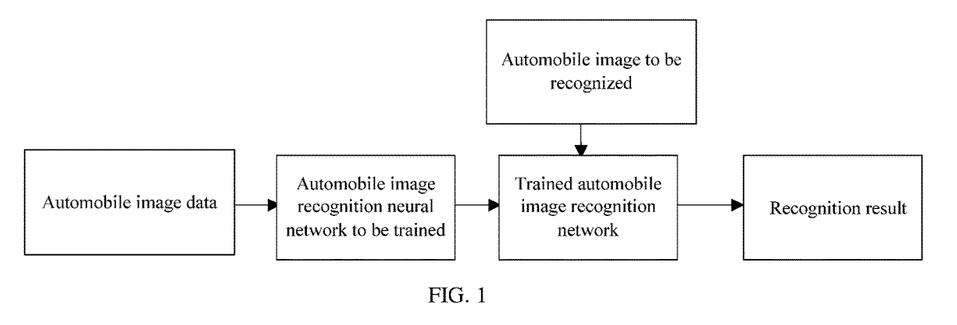
FIG. 1 is a schematic diagram of a network structure in the prior art.

In the field of recognizing an automobile image, due to different automobile shapes, automobile colors in the market, as well as different driving environments, in order to accurately recognize the automobile image, a large number of automobile images need to be collected and manually marked in the prior art so as to obtain automobile image data, and use it to train an automobile image recognition model. FIG. 1 is a schematic diagram of a network structure in the prior art. As shown in FIG. 1, in the prior art, automobile images obtained by collecting are manually marked to form automobile image data, which are inputted into an automobile image recognition neural network to be trained so as to train the automobile image data to obtain a trained automobile image recognition neural network, then the trained automobile image recognition neural network is used to recognize an automobile image to be recognized, obtaining a recognition result.

However, since collecting and marking automobile images are of relatively high cost, and may be limited to scenes and environments, it is often impossible to obtain the automobile image data that may be used to train the automobile image recognition model in batches, so how to obtain more automobile image data becomes a problem.

In view of the aforementioned problem that since collecting and marking automobile images are of relatively high cost, and may be limited to scenes and environments, it is often impossible to obtain the automobile image data that may be used to train the automobile image recognition model in batches, the present disclosure provides a method and an apparatus for processing automobile image data, and a readable storage medium. It should be noted that the method and the apparatus for processing the automobile image data and the readable storage medium according to the present disclosure may be applied to a wide range of scenes in which the automobile image recognition model and automobile image data are required, and these application scenes includes, but are not limited to, a peccancy vehicle recognition scene, a night driving vehicle recognition scene, an automobile big data processing recognition scene, an automobile unmanned scene, and the like.

Figure 2:
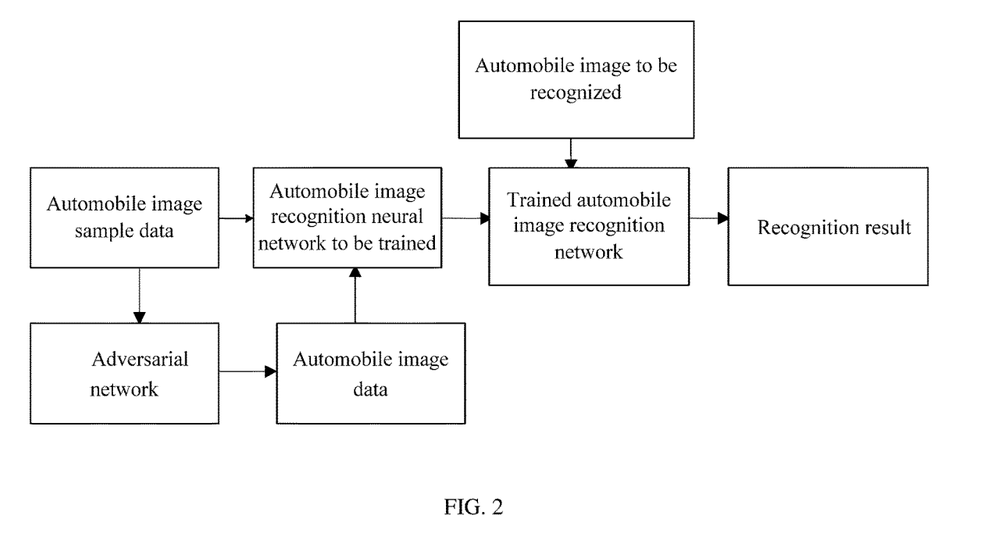
FIG. 2 is a schematic diagram of a network structure on which the present disclosure is based.

FIG. 2 is a schematic diagram of a network structure on which the present disclosure is based. Different from the prior art, in the present application, automobile image sample data obtained by collecting and marking are inputted into an adversarial network to obtain a large number of automobile image data, and an automobile image recognition neural network to be trained is trained by using these automobile image data together with the aforementioned automobile image sample data to obtain a trained automobile image recognition neural network, then an automobile image to be recognized is recognized by using the trained automobile image recognition neural network and a recognition result is obtained.

Figure 3:
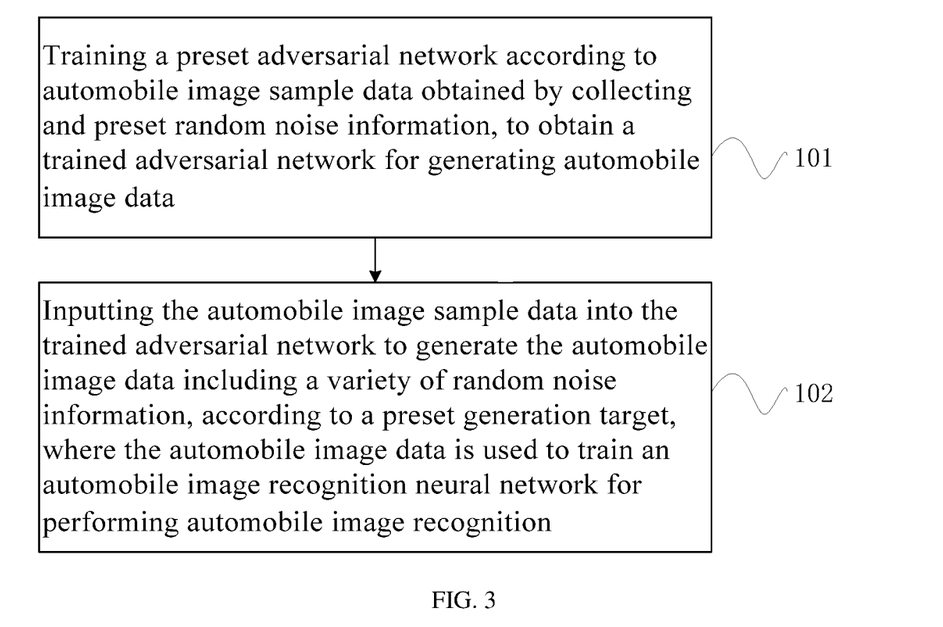
FIG. 3 is a schematic flowchart of a method for processing automobile image data according to Embodiment I of the present disclosure.

Specifically, FIG. 3 is a schematic flowchart of a method for processing automobile image data according to Embodiment I of the present disclosure. As shown in FIG. 3, the method for processing automobile image data according to Embodiment I of the present disclosure includes:

Step 101: training a preset adversarial network according to automobile image sample data obtained by collecting and preset random noise information, to obtain a trained adversarial network for generating automobile image data;

Step 102: inputting the automobile image sample data into the trained adversarial network to generate the automobile image data including a variety of random noise information, according to a preset generation target, where the automobile image data is used to train an automobile image recognition neural network for performing automobile image recognition.

It should be noted that an executive entity of the methods for processing automobile image data according to the present disclosure specifically may be an automobile image data processing apparatus, and the automobile image data processing apparatus may be implemented in the form of hardware and/or software. Generally, it may be integrated into a cloud server, and is used together with a data server storing various types of automobile images. In addition, a server on which the automobile image data processing apparatus is based may be the same server as the data server, or a different server belonging to the same server cluster, and this is not limited in the present disclosure.

The automobile image data provided by the present application may be specifically used for training an automobile image recognition neural network, that is, being used for a training sample of the automobile image recognition neural network. Specifically, the method for processing automobile image data provided in this embodiment may include first constructing an adversarial network, and then inputting automobile image sample data obtained by collecting and preset random noise information into the constructed adversarial network to train the adversarial network, so as to obtain a trained adversarial network, which may be used to generate automobile image data.

Specifically, after the construction of the adversarial network is completed, preset distributed random noise information and automobile image sample data that is obtained by collecting and has been manually marked may be inputted into the adversarial network, so that the adversarial network learns and obtains a mapping relationship between the random noise information and the automobile image sample data, and adjusts weighting parameters in the adversarial network itself with the learned mapping relationship, to obtain the trained adversarial network. Where, the preset random noise information may be represented in the form of a preset distributed noise vector, and the preset distribution includes, but is not limited to, a continuous distribution such as a normal distribution, an exponential distribution or a uniform distribution, or may be a discrete distribution such as a Poisson distribution or a binomial distribution.

Further, in this step, the adversarial network is trained in the following way: generating, by an adversarial generation sub-network in the adversarial network, a first generation sample, according to the random noise information and the automobile image sample data obtained by collecting; obtaining, by an adversarial recognition sub-network in the adversarial network, a first judgment result corresponding to the first generation sample; and training the adversarial generation sub-network and the adversarial recognition sub-network, to obtain the trained adversarial network, according to a preset convergence equation.

In general, the adversarial network generally includes the adversarial generation sub-network and the adversarial recognition sub-network. The purpose of the adversarial generation sub-networks is to output as much as possible a generation sample that approximates to real sample data obtained, and the purpose of the adversarial recognition sub-network is to distinguish as much as possible whether a sample inputted is the real sample data. That is to say, the adversarial generation sub-network will generate a first generation sample according to the automobile image sample data and the aforementioned random noise information, and the adversarial recognition sub-network will judge whether the first generation sample is a real sample data, and give a corresponding first judgment result. Subsequently, in order to realize the training of the adversarial network, the aforementioned obtained result may be iteratively processed by using a preset convergence equation, that is, for each automobile image sample data, the steps of generating the first generation sample and the corresponding first judgment result are repeated, and the each automobile image sample data is correspondingly updated according to the result obtained each time and parameters, such as weighting in the adversarial network, where the update method may be an existing gradient ascending method or a gradient descending method, which will not be repeated in this embodiment. After the aforementioned training, the trained adversarial network may be finally obtained.

Then, the automobile image sample data is inputted into the trained adversarial network according to a preset generation target, to generate automobile image data including a variety of random noise information are d, where the automobile image data is used to train an automobile image recognition neural network for performing automobile image recognition.

Specifically, generating the automobile image data may be performed by the following method: extracting feature information of the automobile image sample data by using the trained adversarial network; and adding the random noise information to the feature information by using the trained adversarial network according to the preset target, to obtain an automobile image data including a variety of random noise information, In this embodiment, by generating automobile image data that may be used to train an automobile image recognition neural network by using an adversarial network, the problem existing in the prior art that in order to train the automobile image recognition neural network, it is necessary to collect a large number of automobile images and manually mark them and the cost of collecting and marking is relatively high, is avoided.

In other optional embodiments, a preset constructed automobile image recognition neural network to be trained is trained according to the automobile image sample data and the generated automobile image sample data, to obtain a trained automobile image recognition neural network; a collected automobile image to be recognized is recognized by using the trained automobile image recognition neural network, to obtain a recognition result. The automobile image recognition neural network may be used in scenes such as a peccancy vehicle recognition scene, a night driving vehicle recognition scene, an automobile big data processing recognition scene, an automobile unmanned scene, and the like, so as to provide an automobile image recognition result for each scene.

The method for processing automobile image data according to the present disclosure is performed by training a preset adversarial network according to automobile image sample data obtained by collecting and preset random noise information, to obtain a trained adversarial network for generating automobile image data; and inputting the automobile image sample data into the trained adversarial network according to a preset generation target, to generate automobile image data including a variety of random noise information, where the automobile image data is used to train an automobile image recognition neural network for performing an automobile image recognition. Thus, it is possible to use an adversarial network to generate automobile image data that may be used to train an automobile image recognition neural network, thereby amplifying the amount of data and reducing the cost of obtaining the data.

Figure 4:
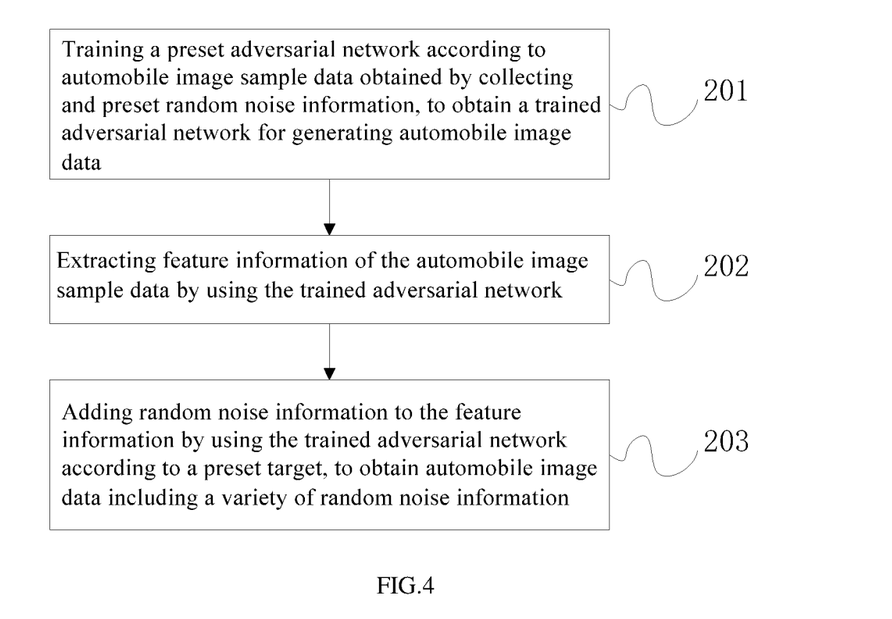
FIG. 4 is a schematic flowchart of a method for processing automobile image data according to Embodiment II of the present disclosure.

In order to further explain the method for processing automobile image data according to the present disclosure, FIG. 4 is a schematic flowchart of a method for processing automobile image data according to Embodiment II of the present disclosure. As shown in FIG. 4, the method for processing automobile image data includes:

Step 201: training a preset adversarial network according to automobile image sample data obtained by collecting and preset random noise information, to obtain a trained adversarial network for generating automobile image data;

Step 202: extracting feature information of the automobile image sample data by using the trained adversarial network; and Step 203: adding random noise information to the feature information by using the trained adversarial network according to a preset target, to obtain automobile image data including a variety of random noise information.

It should be noted that an executive entity of the method for processing automobile image data according to the present disclosure specifically may be an automobile image data processing apparatus, and the automobile image data processing apparatus may be implemented in the form of hardware and/or software. Generally, it may be integrated into a cloud server, and is used together with a data server storing various types of automobile images. In addition, a server on which the automobile image data processing apparatus is based may be the same server as the data server, or a different server belonging to the same server cluster, and this is not limited in the present disclosure.

Similar to Embodiment I, the automobile image data provided by the present application may be specifically used for training an automobile image recognition neural network, that is, being used for a training sample of the automobile image recognition neural network. Specifically, the method for processing automobile image data provided in this embodiment may include first constructing an adversarial network, and then inputting automobile image sample data obtained by collecting and preset random noise information into the constructed adversarial network to train the adversarial network, so as to obtain a trained adversarial network, which may be used to generate automobile image data. The specific implementation is similar to Embodiment I, and is not repeated herein.

Different from Embodiment I, in this embodiment, inputting the automobile image sample data into the trained adversarial network according to a preset generation target, to generate automobile image data including a variety of random noise information, specifically may include: extracting feature information of the automobile image sample data by using the trained adversarial network; and adding random noise information to the feature information by using the trained adversarial network according to a preset target, to obtain automobile image data including a variety of random noise information.

Specifically, taking an automobile unmanned scene as an example, in this application scene, an automobile image recognition neural network for recognizing an automobile image needs to recognize different types of automobiles in different environments, so as to provide a corresponding support for an automatic driving module. The different environments include, but are not limited to, a weather environment, a time environment, and the different types include, but are not limited to, automobile shapes. For example, in a rainy environment and in a sunny environment, image data of the same model automobile will have a certain difference in background color, automobile color and even automobile shape, and in order to be able to recognize the same automobile in different environments, when training an automobile image recognition neural network, it is necessary to collect image data of the same automobile in each of the aforementioned environments for learning. However, as described in the background part, since both the cost of collecting image data and the cost of manual marking are high, it is very difficult to collect image data of the same automobile in each of the aforementioned environments. Therefore, the present embodiment, by utilizing a solution of an adversarial network, can effectively utilize the existing automobile image data to amplify the automobile image data that may be used to train the automobile image recognition neural network, so as to solve the above technical problem.

Further, in the present embodiment, the random noise information includes one or more of an automobile color noise, an automobile shape noise, and a background color noise.

When the random noise information includes the automobile color noise, the extracted feature information of the automobile image sample data includes an automobile non-color feature. It should be noted that an automobile color refers to a color of an automobile body. In the aforementioned scene, in order to more accurately recognize an image of a certain type of automobile, it is necessary to collect this type of automobile in different colors, and in this case, the random noise information may include the automobile color noise, such as a noise vector for representing color three-element information, and the like.

The correspondingly extracted feature information of the automobile image sample data needs to include other automobile feature other than the aforementioned automobile color feature, that is, an automobile non-color feature, such as an automobile shape feature, a background color feature, and the like.

Subsequently, the automobile color noise may be added to the automobile non-color feature using the trained adversarial network according to a preset target automobile color, to obtain an automobile image data including a preset automobile color. For example, the preset target automobile color may include common black, red, and other automobile colors, an automobile color noise corresponding to the preset target is obtained according to the preset target, and the automobile color noise is effectively combined with the automobile non-color feature, to obtain the automobile image data including the preset automobile color.

And/or,

When the random noise information includes the automobile shape noise, the extracted feature information of the automobile image sample data includes an automobile non-shape feature. It should be noted that an automobile shape refers to a shape of an automobile body and is generally associated with a type of automobile. In the aforementioned scene, in order to more accurately recognize an automobile image, for example, in rainy scene, it is necessary to collect a large number of different types of automobiles in the rainy scene, and in this case, the random noise information may include the automobile shape noise, such as a noise vector for representing outline feature information, and the like.

The correspondingly extracted feature information of the automobile image sample data needs to include other automobile feature other than the aforementioned automobile shape feature, that is, an automobile non-color feature, such as an automobile color feature, a background color feature, and the like.

Subsequently, the automobile shape noise may be added to the automobile non-color feature using the trained adversarial network according to a preset target shape, to obtain the automobile image data including a preset automobile shape. Where the preset target shape is analyzed to obtain an automobile shape noise corresponding to the preset target shape, and the automobile shape noise is effectively combined with the automobile non-color feature, to obtain the automobile image data including the preset automobile shape.

And/or

When the random noise information includes the background color noise, the extracted feature information of the automobile image sample data includes an automobile non-background color feature. It should be noted that a background color refers to a color of a background part other than an automobile body in an image, and is generally used to indicate an environment (such as a night, a daytime, a rainy day, and the like) in which the image is located, and is closely related to the environment or weather. In the aforementioned scene, in order to more accurately recognize images of the same automobile in different environments, it is necessary to collect images of the automobile in different environments, and in this case, the random noise information may include the background color noise, such as a noise vector for representing background color feature information, and the like.

The correspondingly extracted feature information of the automobile image sample data needs to include other automobile feature other than the aforementioned background color feature, that is, a non-background color feature, such as an automobile color feature, an automobile shape feature, and the like.

Subsequently, the background color noise may be added to the automobile non-background color feature by using the trained adversarial network according to a preset target background color, to obtain automobile image data including a preset background color. Where the preset target background color is analyzed to obtain a background color noise corresponding to the preset target background color, and the background color noise is effectively combined with the automobile non-background color feature, to obtain the automobile image data including the preset background color.

In the present embodiment, by generating automobile image data that may be used to train an automobile image recognition neural network by using an adversarial network, the problem existing in the prior art that in order to train the automobile image recognition neural network, it is necessary to collect a large number of automobile images and manually mark them and the cost of collecting and marking is relatively high, is avoided.

In other optional embodiments, a preset constructed automobile image recognition neural network to be trained is trained according to the automobile image sample data and the generated automobile image sample data, to obtain a trained automobile image recognition neural network; a collected automobile image to be recognized is recognized by using the trained automobile image recognition neural network, to obtain a recognition result. The automobile image recognition neural network may be used in scenes such as a peccancy vehicle recognition scene, a night driving vehicle recognition scene, an automobile big data processing recognition scene, an automobile unmanned scene, and the like, so as to provide an automobile image recognition result for each scene.

The method for processing automobile image data according to the present disclosure is performed by training a preset adversarial network according to automobile image sample data obtained by collecting and preset random noise information, to obtain a trained adversarial network for generating automobile image data; and inputting the automobile image sample data into the trained adversarial network according to a preset generation target, to generate automobile image data including a variety of random noise information, where the automobile image data is used to train an automobile image recognition neural network for performing an automobile image recognition. Thus, it is possible to use an adversarial network to generate automobile image data that may be used to train an automobile image recognition neural network, thereby amplifying the amount of data and reducing the cost of obtaining the data.

Figure 5:
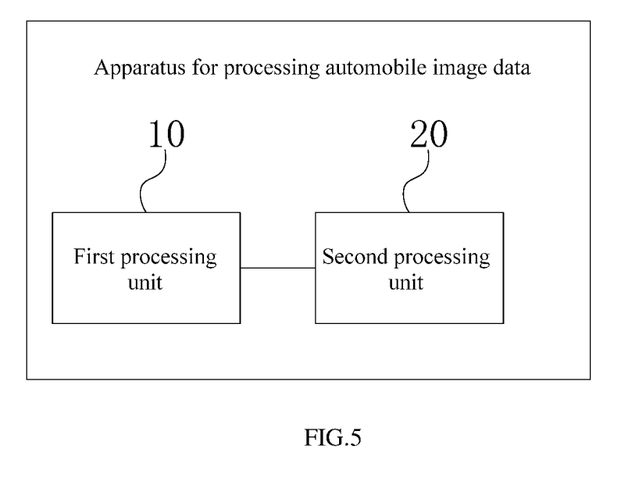
FIG. 5 is a schematic structural diagram of an apparatus for processing automobile image data according to Embodiment III of the present disclosure.

FIG. 5 is a schematic structural diagram of an apparatus for processing automobile image data according to Embodiment III of the present disclosure; as shown in FIG. 5, the apparatus for processing automobile image data includes:

a first processing unit 10 configured to train a preset adversarial network according to automobile image sample data obtained by collecting and preset random noise information, to obtain a trained adversarial network for generating automobile image data; and a second processing unit 20 configured to input the automobile image sample data into the trained adversarial network according to a preset generation target, to generate automobile image data including a variety of random noise information, where the automobile image data is used to train an automobile image recognition neural network for performing automobile image recognition.

In the present embodiment, by using an adversarial network to generate automobile image data that may be used to train an automobile image recognition neural network, the problem existing in the prior art that in order to train the automobile image recognition neural network, it is necessary to collect a large number of automobile images and manually mark them and the cost of collecting and marking is relatively high, is avoided.

In an optional embodiment, the first processing unit 10 is specifically configured to:

generate, by an adversarial generation sub-network in the adversarial network, a first generation sample according to the random noise information and the automobile image sample data obtained by collecting;

obtain, by an adversarial recognition sub-network in the adversarial network, a first judgment result corresponding to the first generation sample; and train the adversarial generation sub-network and the adversarial recognition sub-network according to a preset convergence equation, to obtain a trained adversarial network.

In an optional embodiment, the second processing unit 20 is specifically configured to:

extract feature information of the automobile image sample data by the trained adversarial network; and add random noise information to the feature information by using the trained adversarial network according to the preset target, to obtain automobile image data including a variety of random noise information.

In an optional embodiment, the random noise information includes one or more of an automobile color noise, an automobile shape noise, and a background color noise.

In an optional embodiment, when the random noise information includes the automobile color noise, the extracted feature information of the automobile image sample data includes an automobile non-color feature; and the second processing unit 20 is specifically configured to add the automobile color noise to the automobile non-color feature by using the trained adversarial network according to a preset target automobile color, to obtain automobile image data including a preset automobile color.

In an optional embodiment, when the random noise information includes the automobile shape noise, the extracted feature information of the automobile image sample data includes an automobile non-shape feature; and the second processing unit 20 is specifically configured to add the automobile shape noise to the automobile non-shape feature by using the trained adversarial network according to the preset target, to obtain automobile image data including a preset automobile shape.

In an optional embodiment, when the random noise information includes the background color noise, the extracted feature information of the automobile image sample data includes an automobile non-background color feature; and the second processing unit 20 is specifically configured to add the background color noise to the automobile non-background color feature by using the trained adversarial network according to a preset target background color, to obtain automobile image data including a preset background color.

The method for processing automobile image data according to Embodiment III of the present disclosure is performed by training a preset adversarial network according to automobile image sample data obtained by collecting and preset random noise information, to obtain a trained adversarial network for generating automobile image data; and inputting the automobile image sample data into the trained adversarial network according to a preset generation target, to generate automobile image data including a variety of random noise information, where the automobile image data is used to train an automobile image recognition neural network for performing an automobile image recognition. Thus, it is possible to use an adversarial network to generate automobile image data that may be used to train an automobile image recognition neural network, thereby amplifying the amount of data and reducing the cost of obtaining the data.

Figure 6:
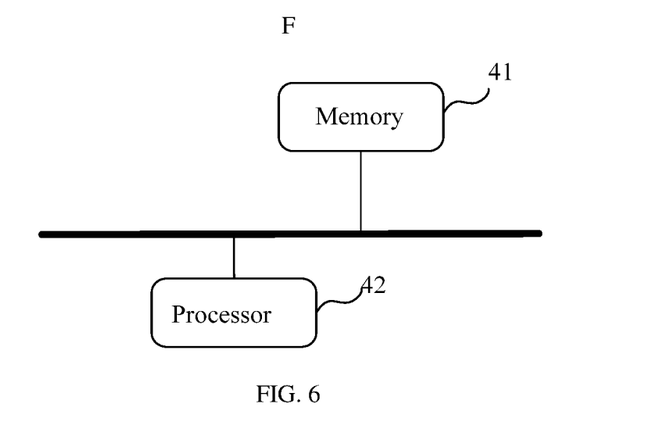
FIG. 6 is a schematic structural diagram of hardware of an apparatus for processing automobile image data according to Embodiment IV of the present disclosure.

FIG. 6 is a schematic structural diagram of hardware of an apparatus for processing automobile image data according to Embodiment IV of the present disclosure. As shown in FIG. 6, the apparatus for processing automobile image data includes a memory 41, a processor 42 and a computer program stored on the memory 41 and runnable on the processor 42, and the method according to any one of the embodiments above is performed when the processor 42 runs the computer program.

The present disclosure provides a method for processing automobile image data, the method includes:

constructing an automobile image recognition neural network to be trained; and training the automobile image recognition neural network to be trained by using the automobile image data obtained by the method according to Embodiment I or Embodiment II above, to obtain a trained automobile image recognition neural network.

In the meantime, the present disclosure provides a method for processing automobile image data, the method includes: collecting an automobile image to be recognized; and recognizing the automobile image to be recognized by using a trained automobile image recognition neural network, to obtain a recognition result; where the trained automobile image recognition neural network is obtained by the method described above.

In another aspect, the present disclosure provides an apparatus for processing automobile image data, the apparatus includes:

a constructing unit configured to construct an automobile image recognition neural network to be trained; and a training unit configured to train the automobile image recognition neural network to be trained by using the automobile image data obtained by the method according to the aforementioned Embodiment I or Embodiment II, to obtain a trained automobile image recognition neural network.

In another aspect, the present disclosure provides an apparatus for processing automobile image data, the apparatus includes:

a collecting unit configured to collect an automobile image to be recognized; and a recognizing unit configured to recognize the automobile image to be recognized by using a trained automobile image recognition neural network, to obtain a recognition result; where the trained automobile image recognition neural network is obtained by the aforementioned method.

The present disclosure also provides a readable storage medium, including a program, when the program runs on a terminal, the terminal performs the method according to any one of the aforementioned embodiments.

Persons of ordinary skill in the art may understand that all or some of the steps for implementing the method embodiments above may be accomplished by program instructing relevant hardware. The program may be stored in a computer readable storage medium. When the program runs, the steps of the method embodiments are performed. The storage medium may be any medium that is capable of storing a program code, such as a ROM, a RAM, a magnetic disk, or an optical disk.

Finally, it should be noted that the aforementioned embodiments are merely intended for illustrating the technical solutions of the present disclosure other than limiting the present disclosure. Although the present disclosure is described in detail with reference to the aforementioned embodiments, persons of ordinary skill in the art should understand that they may still make modifications to the technical solutions described in the aforementioned embodiments or make equivalent substitutions to some or all of the technical features therein, and these modifications and substitutions will not make the essence of corresponding technical solutions depart from the scope of the technical solutions of the embodiments of the present disclosure.

What is claimed is:

1. A method for processing automobile image data, comprising:

training a preset adversarial network according to automobile image sample data obtained by collecting and preset random noise information, wherein the adversarial network learns and obtains a mapping relationship between the preset random noise information and the automobile image sample data, and adjusts weighting parameters in the adversarial network itself with the learned mapping relationship, to obtain a trained adversarial network for generating automobile image data; and inputting the automobile image sample data into the trained adversarial network according to a preset generation target, to generate automobile image data comprising a variety of random noise information, wherein the automobile image data is used to train an automobile image recognition neural network for performing an automobile image recognition;

wherein the random noise information comprises a background color noise, and the background color noise is used to indicate an environment in which the image is located;

wherein the environment in which the image is located comprises a night, a daytime and or a rainy day.

2. The method for processing automobile image data according to claim 1, wherein the training a preset adversarial network according to automobile image sample data obtained by collecting and preset random noise information, to obtain a trained adversarial network for generating automobile image data, comprises:

generating, by an adversarial generation sub-network in the adversarial network, a first generation sample, according to the random noise information and the automobile image sample data obtained by collecting;

obtaining, by an adversarial recognition sub-network in the adversarial network, a first judgment result corresponding to the first generation sample; and training the adversarial generation sub-network and the adversarial recognition sub-network according to a preset convergence equation, to obtain a trained adversarial network.

3. The method for processing automobile image data according to claim 1, wherein the inputting the automobile image sample data into the trained adversarial network according to a preset generation target, to generate automobile image data comprising a variety of random noise information, comprises:

extracting feature information of the automobile image sample data by using the trained adversarial network; and adding random noise information to the feature information by using the trained adversarial network according to a preset target, to obtain the automobile image data comprising a variety of random noise information.

4. The method for processing automobile image data according to claim 3, wherein the random noise information further comprises an automobile color noise and an automobile shape noise, and a background color noise.

5. The method for processing automobile image data according to claim 4, wherein when the random noise information comprises the automobile color noise, the extracted feature information of the automobile image sample data comprises an automobile non-color feature; and the adding random noise information to the feature information by using the trained adversarial network according to a preset target, to obtain the automobile image data comprising a variety of random noise information, comprises:

adding the automobile color noise to the automobile non-color feature by using the trained adversarial network according to a preset target automobile color, to obtain automobile image data comprising a preset automobile color.

6. The method for processing automobile image data according to claim 4, wherein when the random noise information comprises the automobile shape noise, the extracted feature information of the automobile image sample data comprises an automobile non-shape feature; and the adding random noise information to the feature information by using the trained adversarial network according to a preset target, to obtain the automobile image data comprising a variety of random noise information, comprises:

adding the automobile shape noise to the automobile non-shape feature by using the trained adversarial network according to a preset target shape, to obtain automobile image data comprising a preset automobile shape.

7. The method for processing automobile image data according to claim 4, wherein when the random noise information comprises the background color noise, the extracted feature information of the automobile image sample data comprises an automobile non-background color feature; and the adding random noise information to the feature information by using the trained adversarial network according to a preset target, to obtain the automobile image data comprising a variety of random noise information, comprises:

adding the background color noise to the automobile non-background color feature by using the trained adversarial network, according to a preset target background color, to obtain automobile image data comprising a preset background color.

8. A method for processing automobile image data, comprising:

constructing an automobile image recognition neural network to be trained; and training the automobile image recognition neural network to be trained by using the automobile image data obtained by the method according to claim 1, to obtain a trained automobile image recognition neural network.

9. A method for processing automobile image data, comprising:

collecting an automobile image to be recognized; and recognizing the automobile image to be recognized by using a trained automobile image recognition neural network, to obtain a recognition result; wherein the trained automobile image recognition neural network is obtained by the method according to claim 8.

10. An apparatus for processing automobile image data, comprising:

a memory, a processor connected to the memory, and a computer program stored on the memory and runnable on the processor, wherein the computer program, when executed by the processor, causes the processor to:

train a preset adversarial network according to automobile image sample data obtained by collecting and preset random noise information, wherein the adversarial network learns and obtains a mapping relationship between the preset random noise information and the automobile image sample data, and adjusts weighting parameters in the adversarial network itself with the learned mapping relationship, to obtain a trained adversarial network for generating automobile image data; and input the automobile image sample data into the trained adversarial network according to a preset generation target, to generate automobile image data comprising a variety of random noise information, wherein the automobile image data is used to train an automobile image recognition neural network for performing an automobile image recognition;

wherein the random noise information comprises a background color noise, and the background color noise is used to indicate an environment in which the image is located;

wherein the environment in which the image is located comprises a night, a daytime or a rainy day.

11. The apparatus for processing automobile image data according to claim 10, wherein the computer program further causes the processor to:

generate, by an adversarial generation sub-network in the adversarial network, a first generation sample, according to the random noise information and the automobile image sample data obtained by collecting;

obtain, by an adversarial recognition sub-network in the adversarial network, a first judgment result corresponding to the first generation sample; and train the adversarial generation sub-network and the adversarial recognition sub-network, according to a preset convergence equation, to obtain the trained adversarial network.

12. The apparatus for processing automobile image data according to claim 10, wherein the computer program further causes the processor to:

extract feature information of the automobile image sample data by using the trained adversarial network; and add random noise information to the feature information by using the trained adversarial network according to a preset target, to obtain the automobile image data comprising a variety of random noise information.

13. The apparatus for processing automobile image data according to claim 12, wherein the random noise information comprises an automobile color noise and an automobile shape noise.

14. The apparatus for processing automobile image data according to claim 12, wherein when the random noise information comprises an automobile color noise, the extracted feature information of the automobile image sample data comprises an automobile non-color feature; and the computer program further causes the processor to add the automobile color noise to the automobile non-color feature by using the trained adversarial network according to a preset target automobile color, to obtain automobile image data comprising a preset automobile color.

15. The apparatus for processing automobile image data according to claim 12, wherein when the random noise information comprises an automobile shape noise, the extracted feature information of the automobile image sample data comprises an automobile non-shape feature; and the computer program further causes the processor to add the automobile shape noise to the automobile non-shape feature by using the trained adversarial network according to a preset target shape, to obtain automobile image data comprising a preset automobile shape.

16. The apparatus for processing automobile image data according to claim 12, wherein when the random noise information comprises a background color noise, the extracted feature information of the automobile image sample data comprises an automobile non-background color feature; and the computer program further causes the processor to add the background color noise to the automobile non-background color feature by using the trained adversarial network according to a preset target background color, to obtain automobile image data comprising a preset background color.

17. An apparatus for processing automobile image data, comprising: a memory, a processor connected to the memory, and a computer program stored on the memory and runnable on the processor, wherein the computer program, when executed by the processor, causes the processor to:

construct an automobile image recognition neural network to be trained; and train the automobile image recognition neural network to be trained by using the automobile image data obtained by the method according to claim 1, to obtain a trained automobile image recognition neural network.

18. An apparatus for processing automobile image data, comprising: a memory, a processor connected to the memory, and a computer program stored on the memory and runnable on the processor, wherein the computer program, when executed by the processor, causes the processor to:

collect an automobile image to be recognized; and recognize the automobile image to be recognized by using a trained automobile image recognition neural network, to obtain a recognition result; wherein the trained automobile image recognition neural network is obtained by the method according to claim 8.

19. A non-transitory computer-readable storage medium, comprising a program, when the program runs on a terminal, the terminal performs the method according to claim 1.

* * * * *